United States Patent
Pazhyannur et al.

(10) Patent No.: US 11,412,367 B2
(45) Date of Patent: Aug. 9, 2022

(54) SEAMLESS MOBILITY BETWEEN 802.11AX AND 802.11AY WI-FI TECHNOLOGIES

(71) Applicant: Cisco Technology, Inc., San Jose, CA (US)

(72) Inventors: Rajesh S. Pazhyannur, Fremont, CA (US); Anand Oswal, Pleasanton, CA (US); Arun G. Khanna, Sunnyvale, CA (US); Sudhir Jain, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 130 days.

(21) Appl. No.: 16/895,093

(22) Filed: Jun. 8, 2020

(65) Prior Publication Data

US 2021/0385643 A1 Dec. 9, 2021

(51) Int. Cl.
*H04W 4/00* (2018.01)
*H04W 8/02* (2009.01)
*H04L 101/622* (2022.01)
*H04W 48/16* (2009.01)
*H04W 84/12* (2009.01)

(52) U.S. Cl.
CPC ........... *H04W 8/02* (2013.01); *H04L 61/6022* (2013.01); *H04W 48/16* (2013.01); *H04W 84/12* (2013.01)

(58) Field of Classification Search
CPC ..... H04W 48/16; H04W 48/18; H04W 88/06; H04W 84/12; H04W 92/24; H04W 8/02; H04W 8/06; H04W 8/12; H04W 8/13; H04W 8/18; H04W 8/26; H04W 8/183; H04L 61/6022
USPC ................. 370/338; 455/432.1, 432.2, 432.3
See application file for complete search history.

(56) References Cited

U.S. PATENT DOCUMENTS

| | | | |
|---|---|---|---|
| 10,251,107 B1 | 4/2019 | Crespi et al. | |
| 10,327,184 B2 | 6/2019 | Srivastava et al. | |
| 10,425,976 B2 | 9/2019 | Borges et al. | |
| 2014/0269662 A1* | 9/2014 | Muhamed | H04W 88/06 370/338 |
| 2016/0081009 A1* | 3/2016 | Tailor | H04W 4/80 455/432.1 |
| 2016/0112942 A1* | 4/2016 | Chang | H04B 7/0421 455/434 |

(Continued)

*Primary Examiner* — Temica M Beamer
(74) *Attorney, Agent, or Firm* — Baker Botts, LLP (57) ABSTRACT

The present disclosure is directed to seamless mobility between Wi-Fi technologies and includes one or more processors and one or more computer-readable non-transitory storage media comprising instructions that perform operations including detecting a client device having 802.11ax and 802.11ay Wi-Fi capability, identifying a 802.11ax access point associated with a first data path, wherein the first data path is configured to transmit traffic to and from the client device, identifying a 802.11ay access point associated with a second data path, wherein the second data path is configured to transmit the traffic to and from the client device, and wherein the 802.11ay access point is non-colocated with the 802.11ax access point, and establishing a mobility anchor point through which the traffic is switched, wherein a determination is made in the mobility anchor point as to whether the traffic will be transmitted via the 802.11ax access point through the first data path or via the 802.11ay access point through the second data path.

17 Claims, 4 Drawing Sheets

(56) References Cited

U.S. PATENT DOCUMENTS

| | | | | |
|---|---|---|---|---|
| 2017/0086115 | A1* | 3/2017 | Chung | H04L 61/6022 |
| 2017/0359773 | A1* | 12/2017 | Boodannavar | H04W 48/20 |
| 2018/0310240 | A1* | 10/2018 | Kannan | H04W 48/20 |
| 2020/0099596 | A1* | 3/2020 | Sun | H04L 65/80 |
| 2020/0221352 | A1* | 7/2020 | Faus Gregori | H04W 8/08 |
| 2020/0229075 | A1* | 7/2020 | Andreoli-Fang | H04W 48/20 |
| 2021/0036988 | A1* | 2/2021 | McKibben | H04L 63/0876 |
| 2021/0204175 | A1* | 7/2021 | Rangaraju | H04W 12/037 |
| 2021/0281994 | A1* | 9/2021 | Stammers | H04W 8/005 |

\* cited by examiner

SEAMLESS MOBILITY BETWEEN 802.11AX AND 802.11AY WI-FI TECHNOLOGIES

TECHNICAL FIELD

The present disclosure generally relates to Wi-Fi technologies, and more specifically to systems and methods for seamless mobility between 802.11ax and 802.11ay Wi-Fi technologies.

BACKGROUND

Wireless networking, also called Wi-Fi or 802.11 networking, uses radio signals to wirelessly connect devices such as computers, phones, and tablets to the Internet at high speeds in homes, businesses, and public spaces. The Institute of Electrical and Electronics Engineers ("IEEE") wireless standard 802.11ax (also referred to herein as "11ax"), marketed as Wi-Fi 6, is one of the next mainstream Wi-Fi protocols in Wi-Fi technology. Another is 802.11ay (also referred to herein as "11ay"). 11ax operates at low frequency bands such as the 2.4 GHz and 5 GHz bands, and can penetrate walls and other physical barriers. In contrast, 11ay operates at the higher 60 GHz band, and cannot effectively penetrate walls.

DESCRIPTION OF EXAMPLE EMBODIMENTS

Overview

According to an embodiment, a system may include one or more processors and one or more computer-readable non-transitory storage media comprising instructions that, when executed by the one or more processors, cause one or more components of the system to perform operations including detecting a client device having 802.11ax and 802.11ay Wi-Fi capability, identifying a 802.11ax access point associated with a first data path, wherein the first data path is configured to transmit traffic to and from the client device, identifying a 802.11ay access point associated with a second data path, wherein the second data path is configured to transmit the traffic to and from the client device, and wherein the 802.11ay access point non-colocated with the 802.11ax access point, and establishing a mobility anchor point through which the traffic is switched, wherein a determination is made in the mobility anchor point as to whether the traffic will be transmitted via the 802.11ax access point through the first data path or via the 802.11ay access point through the second data path.

Moreover, the operation of detecting step may include determining a media access control (MAC) address of the client device.

Additionally, the operations may include creating a connection table for storing the MAC address associated with the client device, and for storing a first identifier associated with the 802.11ax access point and a second identifier associated with the 802.11ay access point, wherein the connection table is used to subsequently identify the client device and the 802.11ax access point associated with the first data path and the 802.11ay access point associated with the second data path.

Moreover, the second data path may include one or more tunnels between the 802.11ay access point and the 802.11ax access point.

Additionally, the determination in the mobility anchor point may be based on an application policy, a past behavior of the client device, or one or more pre-configurations related to at least one of the 802.11ax access point and the 802.11ay access point.

According to another embodiment, a method may include the steps of detecting a client device having 802.11ax and 802.11ay Wi-Fi capability, identifying a 802.11ax access point associated with a first data path, wherein the first data path is configured to transmit traffic to and from the client device, identifying a 802.11ay access point associated with a second data path, wherein the second data path is configured to transmit the traffic to and from the client device, and wherein the 802.11ay access point non-colocated with the 802.11ax access point, and establishing a mobility anchor point through which the traffic is switched, wherein a determination is made in the mobility anchor point as to whether the traffic will be transmitted via the 802.11ax access point through the first data path or via the 802.11ay access point through the second data path.

According to yet another embodiment, one or more computer-readable non-transitory storage media may embody instructions that, when executed by a processor, cause the performance of operations, including detecting a client device having 802.11ax and 802.11ay Wi-Fi capability, identifying a 802.11ax access point associated with a first data path, wherein the first data path is configured to transmit traffic to and from the client device, identifying a 802.11ay access point associated with a second data path, wherein the second data path is configured to transmit the traffic to and from the client device, and wherein the 802.11ay access point non-colocated with the 802.11ax access point, and establishing a mobility anchor point through which the traffic is switched, wherein a determination is made in the mobility anchor point as to whether the traffic will be transmitted via the 802.11ax access point through the first data path or via the 802.11ay access point through the second data path.

Technical advantages of certain embodiments of this disclosure may include one or more of the following. The systems and methods described herein may allow user devices to seamlessly roam from the coverage of one Wi-Fi technology (such as 11ay) to the coverage of another Wi-Fi technology (such as 11ax), and vice versa, without disruption. This may be beneficial, for example, for users who desire to take advantage of a faster Wi-Fi connection offered by 11ay in a particular area, while still maintaining the option to switch back to 11ax after leaving the particular area.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

In today's world, as technology is rapidly evolving, most people carry wireless devices that may send and receive data using Wi-Fi technology. A Wi-Fi connection may be established through an access point, which is a hardware device or configured node on a local area network (LAN) that allows wireless capable devices and wired networks to connect through a wireless standard, such as Wi-Fi.

Wi-Fi 6 (or 11ax) is a relatively new Wi-Fi standard that was developed to address the growing number of mobile and Internet of Things (IoT) devices accessing a wireless network. To manage this increasing density of devices, 11ax operates on both the 2.4 GHz band and the 5 GHz band, and increases throughput capacity by up to four times that of its precursor, Wi-Fi 5 (or 11ac).

Another Wi-Fi standard, the 11ay (sometimes called "Wi-Gig"), is a companion technology to 11ax. 11ay operates on the higher 60 GHz frequency, has a transmission rate of 20-40 Gbps. 11ay is more affected by weather than the 2.4 GHz and 5 GHz frequencies of 11ax and attenuates rapidly through atmospheric gasses. Because of the physics of the 60 GHz band, 11ay is limited by physical boundaries, such as walls, furniture and glass, and requires a clear line of sight between the wireless device and the associated access point. Although 11ay is limited in coverage as compared to 11ax, 11ay has greater speed than 11ax.

In some cases, it may be beneficial to combine 11ax and 11ay technologies. For example, a client may connect to 11ax in an office building. When the client moves into an enclosed space (such as a conference room), he/she may wish to instead connect to 11ay, which, although having a smaller coverage area, operates at a higher speed. When the client moves back out from the enclosed space, he/she may resume connection to 11ax, albeit at a lower speed. The present disclosure is directed to providing a degree of continuity in the foregoing scenario by providing a seamless connection from 11ax to 11ay (and vice versa) without asking the client to connect and/or disconnect. One way to maintain this continuity is to assign the client device a MAC address or an IP address that remains the same, whether it is connected to 11ax or 11ay.

Figure 1:
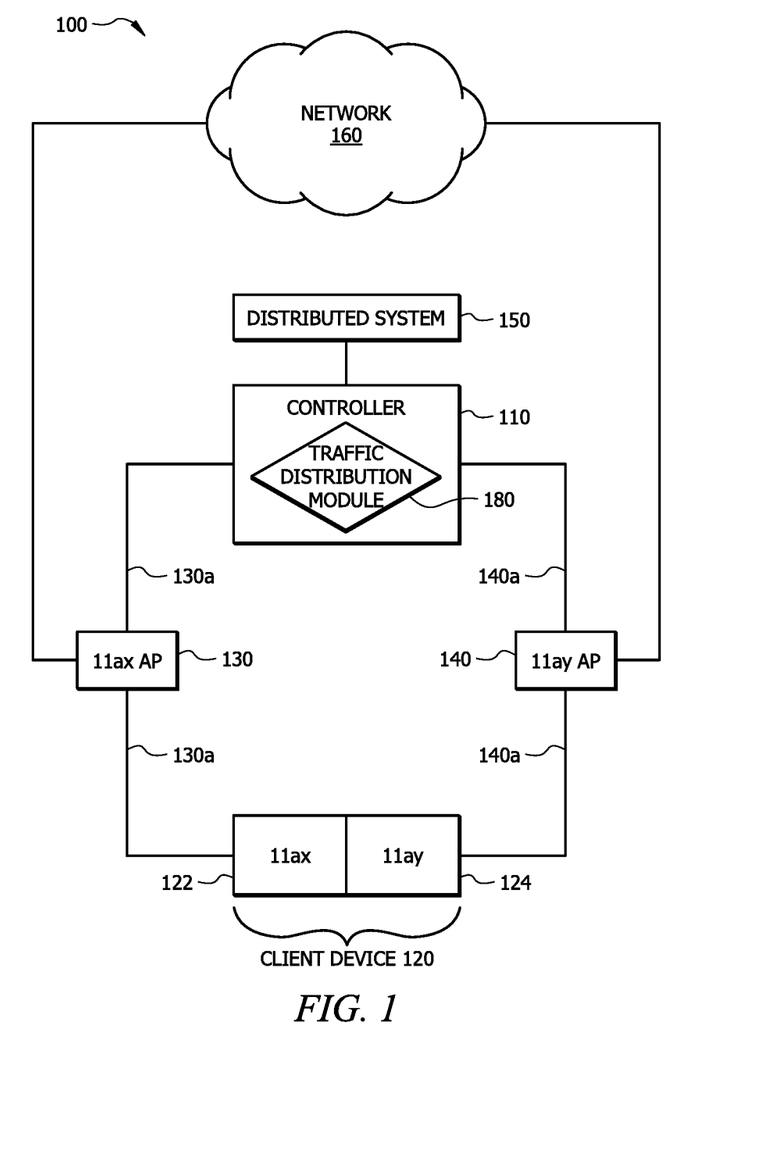
FIG. 1 illustrates a system for providing seamless mobility between 11ax and 11ay Wi-Fi technologies based on central switching, in accordance with certain embodiments.

FIG. 1 depicts a system 100 for providing seamless mobility between 11ax and 11ay Wi-Fi technologies based on central switching. System 100 may include a client device 120 having Wi-Fi capability, including 11ax and 11ay capability. In an embodiment, the client device 120 may be a dual band client configured to establish a Wi-Fi connection via 11ax through a 11ax connection point 122 and via 11ay through a 11ay connection point 124. 11ax and 11ay connection points 122, 124 may be simultaneously active, thereby allowing the client device 120 to connect to Wi-Fi via 11ax or 11ay at any given point in time, as long as the client device 120 is within the respective Wi-Fi coverage of a 11ax or 11ay access point. In an embodiment, certain applications of the client device 120 may be running on a 11ax connection and other applications of the client device 120 may be running on a 11ay connection. Additionally the client device 120 may support a transparent fast session transfer (FST) and may use a single media access control (MAC) address and/or Internet Protocol (IP) address across both 11ax and 11ay connections.

The client device 120 may be configured to send traffic to and receive traffic from a distributed system 150 via a controller 110 and one or more Wi-Fi access points in a network 160. System 100 may include a 11ax access point 130 and a 11ay access point 140. In an embodiment, the 11ax access point 130 and the 11ay access point 140 may be non-colocated. For example, in an enterprise setting, the 11ay access point 140 may be located in a room (such as an office room or conference room) and may have a limited coverage area, and the 11ax access point 130 may be located separately in a corridor and may have a wider coverage area. In an embodiment, the client device 120 may be connected to the 11ax access point 130 (i.e., may have an established communication link with the 11ax access point 130) at all times. In another embodiment, the client device may be connected to the 11ax access point 130 and the 11ay access point 140 at all times.

The 11ax access point 130 may be associated with a first data path 130a, which may be configured to transmit traffic to and from the client device 120 using 11ax Wi-Fi. Similarly, the 11ay access point 140 may be associated with a second data path 140a, which may be configured to transmit traffic to and from the client device 120 using 11ay Wi-Fi. In an embodiment, the first and second data paths 130a, 140a may comprise data tunnels for transmitting data and traffic through the network. In an embodiment, the first data path 130a and the second data path 140a may each extend from the client device 120 to the controller 110 via the 11ax access point 130 and the 11ay access point 140, respectively.

The controller 110 may comprise a wireless LAN controller. In a central switching scheme, such as that illustrated in FIG. 1, the controller 110 may serve the dual role of controlling (i.e., managing the devices of system 100) and directing data/traffic flow (i.e., centrally switching the traffic). Both upstream and downstream traffic may be switched at the controller 110. Since the controller 110 takes on this additional role of traffic switching, the controller 110 may be established as a mobility anchor point, i.e., the point through which traffic, whether outbound or inbound, is switched and transmitted to its destination. The mobility anchor point (here, controller 110) may include a traffic distribution module 180. For downstream traffic (traffic flowing from the distributed system 150 to the client device 120, the traffic distribution module 180 may determine whether to transmit the traffic to the client device 120 via the first data path 130a associated with the 11ax access point 130, or the second data path 140a associated with the 11ay access point 140. This determination may be made based on policies or client behaviors, as described below.

In operation, in the central switching scheme of FIG. 1, the controller 110 may first detect a client device 120, including by identifying whether it is a dual band client having 11ax and 11ay Wi-Fi capability. The controller 110 may detect the client device 120 using a MAC address or IP address associated with the client device 120. If the client device 120 is a dual band client, the controller 110 may identify at least two access points, a 11ax access point 130 and a 11ay access point 140, each access point 130, 140 associated with a data path (or tunnel) established by the controller 110, i.e., the first data path 130a and the second data path 140a, through which traffic may be transmitted to and from the client device 120. The same logical MAC address and/or IP address may be used to identify the client device 120 regardless of whether the client device 120 connects to the 11ax access point 130 via the first data path 130a or the 11ay access point 140 via the second data path 140a. Each of the two access points 130, 140 may also be associated with an identifier. The controller 110 may maintain a connection table for the client device 120, listing an identifier for each access point 130, 140 through which the controller 110 has established a data path 130a, 140a from itself to the client device 120. Thus, by way of example in FIG. 1, for a given client device 120 having a given MAC address, the controller 110 may maintain a connection table to associate the MAC address of the client device 120 with two identifiers for two associated access points, one for the 11ax access point 130 and one for the 11ay access point 140. In other words, the controller 110 may keep track of the client device 120, its associated MAC address, and the 11ax and 11ay access points 130, 140 having data paths 130a, 140a through which traffic may be transmitted between the client device 120 and the controller 110.

In an embodiment, if the system 100 starts with a single 11ax access point 130 and later adds a 11ay access point 140, the controller 110 may update or expand its connection table. Specifically, it may associate the MAC address of the client device 120 with the identifiers of the two access points, one identifier for the existing 11ax access point 130 (which would have already been listed in the connection table) and one for the new 11ay access point 140 (which the controller 110 may add to the connection table).

For upstream traffic (traffic going from the client device 120 to the distributed system 150), the controller 110 may bridge the client traffic to the distributed system 150. For downstream traffic (traffic coming from the distributed system 150 to the client device), the controller 110, acting as the mobility anchor point and having the traffic distribution module 180, may determine whether the traffic will be transmitted to the client device 120 via the 11ax access point 130 through the first data path 130a or via the 11ay access point through the second data path 140a. In an embodiment, this determination may be made based on one or more policies related to one or more applications. The controller 110 may apply the relevant policy (or policies) and then transmit the traffic accordingly. By way of example, if traffic or a given data packet belonging to a certain application is restricted from transmission on 11ay, that policy would be applied to determine that data from that application should not be transmitted through the 11ay access point 140 via the second data path 140a. In another embodiment, the determination may be based on reflective client behavior, as learned by the controller 110. For example, if the client device 120 uses 11ax for certain applications and sends upstream traffic relating to those applications through the 11ax access point 130 via the first data path 130a, the controller 110 may reflectively apply the same policy when sending the downstream traffic for those same applications.

In sum, FIG. 1 describes a central switching scheme, wherein a client device 120 may use a single MAC address or IP address to send and receive traffic using any one of a plurality of data paths 130a, 140a associated with a plurality of access points 130, 140.

Figure 2:
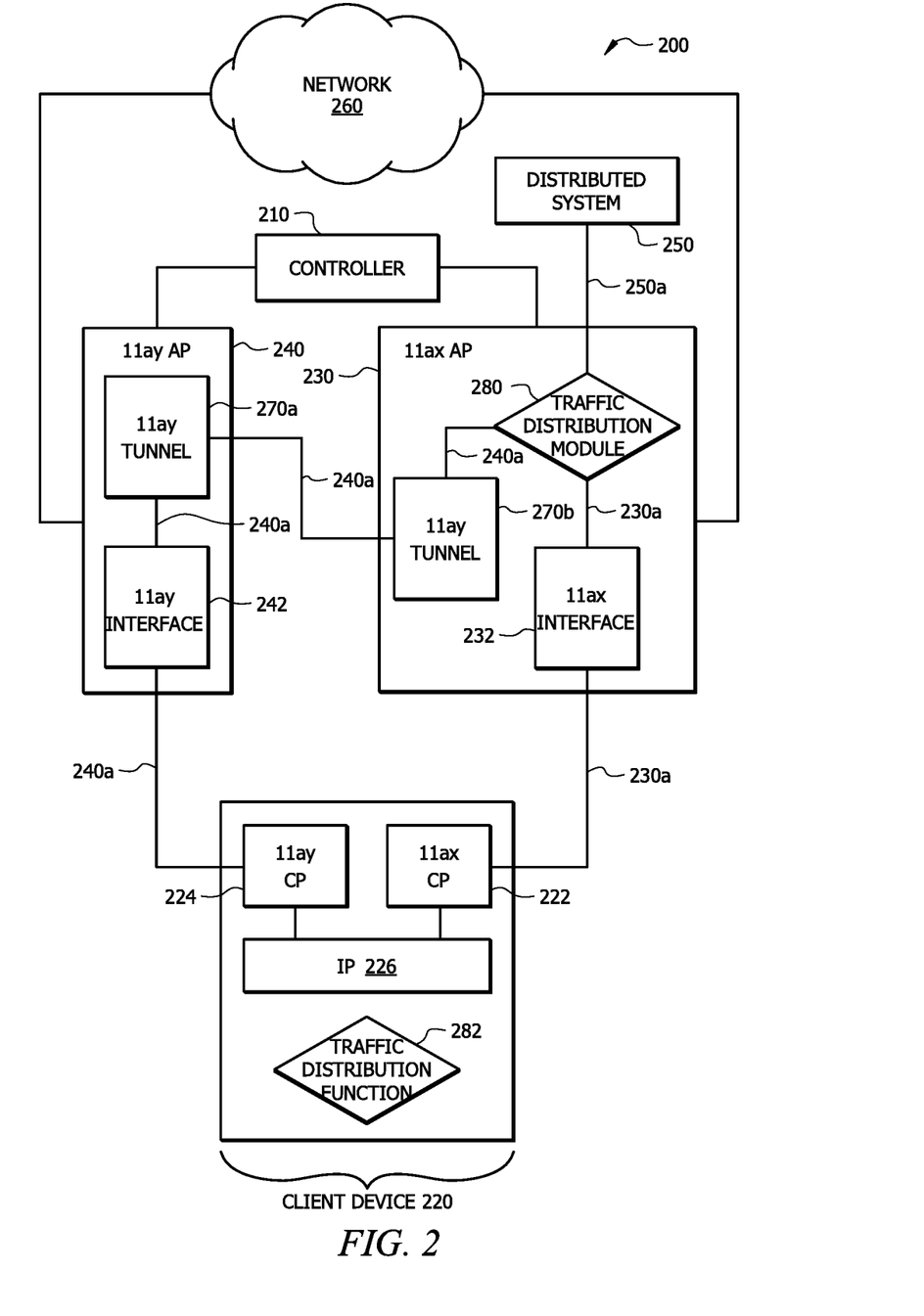
FIG. 2 illustrates a system for providing seamless mobility between 11ax and 11ay Wi-Fi technologies based on local switching, in accordance with certain embodiments.

Reference is now made to FIG. 2, wherein is shown a system 200 for providing seamless mobility between 11ax and 11ay Wi-Fi technologies based on local switching. Unlike central switching (wherein the client data/traffic is switched in the controller), local switching switches the client data/traffic locally in an access point. System 200 may include a client device 220 having Wi-Fi capability, including 11ax and 11ay capability. In an embodiment, the client device 220 may be a dual band client configured to establish a Wi-Fi connection via 11ax through a 11ax connection point 222 (labeled "11ax CP" in FIG. 2), and via 11ay through a 11ay connection point 224 (labeled "11ay CP" in FIG. 2). 11ax and 11ay connection points 222, 224 may be simultaneously active, thereby allowing the client device 120 to connect to Wi-Fi via 11ax or 11ay at any given point in time. In an embodiment, certain applications of the client device 220 may be running on a 11ax connection and other applications of the client device 220 may be running on a 11ay connection. Additionally the client device 220 may support a transparent FST and may use a single MAC address and/or IP address across both 11ax and 11ay connections.

The client device 220 may be configured to send and receive traffic, such as Internet Protocol (IP) packet 226, to and from a distributed system 250 via one or more Wi-Fi access points in a network 260. System 200 may include a 11ax access point 230 and a 11ay access point 240. In an embodiment, the 11ax access point 230 and the 11ay access point 240 may be non-colocated, i.e., located in different physical locations. For example, the 11ay access point 240 may be located in a room (such as an office room or conference room) and may have a limited coverage area, and the 11ax access point 230 may be located separately in a corridor and may have a wider coverage area.

The 11ax access point 230 may include a 11ax interface 232 for establishing a communication link with the 11ax connection point 222 of the client device 220. Likewise, the 11ay access point 240 may include a 11ay interface 242 for establishing a communication link with the 11ay connection point 224 of the client device 220. In an embodiment, the client device 220 may be connected to the 11ax access point 230 (i.e., may have an established communication link with the 11ax access point 230) at all times. In another embodiment, the client device may be connected to the 11ax access point 230 and the 11ay access point 240 at all times.

The 11ax access point 230 may be associated with a first data path 230a, which may be configured to transmit traffic to and from the client device 220 using 11ax Wi-Fi technology. Similarly, the 11ay access point 240 may be associated with a second data path 240a, which may be configured to transmit traffic to and from the client device 220 using 11ay Wi-Fi technology. In an embodiment, the first data path 230a may extend from the 11ax connection point 222 of the client device 220 to the 11ax interface 232, and then to a traffic distribution module 280 in the 11ax access point 230. In an embodiment, the second data path 240a may extend from the 11ay connection point 224 of the client device 220 to the 11ay interface 242, and then to the traffic distribution module 280 in the 11ax access point 230 via one or more 11ay tunnels 270a, 270b established by controller 210, as described more fully below. However, the present disclosure is not to be limited to the particular manner shown and described in conjunction with FIG. 2, but rather, it is to be understood that the first and second data paths 230a, 240a may be configured in any manner known or understood in the art. For example, the first and second data paths 230a, 240a, may include more or less connective paths, may include more or less tunnels, and/or may otherwise be configured in different ways than as shown in FIG. 2.

System 200 may further include controller 210. Unlike the embodiment described in conjunction with FIG. 1, the controller 210 of FIG. 2 may not serve the dual role of controlling and directing data/traffic flow. Rather, the controller 210 may only serve the role of controlling, and as a result may not constitute a mobility anchor point and may not include a traffic distribution module. However, while the controller 210 may not receive or transmit traffic, the controller 210 knows the client device 220 and the Wi-Fi connections between the client device 220 and the 11ax access point 230 and the 11ay access point 240. Specifically, the controller 210 may detect the client device 220, including that the client device 220 is a dual band client having 11ax and 11ay Wi-Fi capability. The controller 210 may also identify the 11ax access point 230, and may establish the first data path 230a (or data tunnel) associated with the 11ax access point 230 configured to transmit traffic to and from the client device 220. Likewise, the controller 210 may identify the 11ay access point 240, and may establish the second data path 240*a* (or data tunnel) associated with the 11ay access point 240 configured to transmit traffic to and from the client device 220.

The controller 210 may further be configured to manage the 11ax access point 230 and the 11ay access point 240, including by setting up one of the access points, 230, 240 as a mobility anchor point, i.e., the point through which traffic is switched and transmitted to its destination. In an embodiment, the controller 210 may set up the 11ax access point 230 as the mobility anchor point of system 200. As the mobility anchor point, the 11ax access point 230 may include a traffic distribution module 280. For downstream traffic (i.e., traffic coming from the distributed system 250 to the client device 220), the traffic distribution module 280 may determine whether to transmit the traffic to the client device 220 via the 11ax access point 230 through the first data path 230*a*, or via the 11ay access point 240 through the second data path 240*a*. This determination may be made based on one or more policies or pre-determined configurations, as described below.

In an embodiment, a traffic distribution function 282 (a functionality similar to the traffic distribution module 280 of the 11ax access point 230) may be included in the client device 220. For upstream traffic (i.e., traffic from the client device 220 to the distributed system 250), the client device, through its traffic distribution function 282, may determine whether to transmit traffic to the distributed system 250 via the 11ax access point 230 through the first data path 230*a*, or via the 11ay access point 240 through the second data path 240*a*.

In an embodiment, once the controller has established the 11ax access point 230 as the mobility anchor point, the controller 210 may instruct a binding between the 11ay access point 240 and the 11ax access point 230, so that traffic may be directed through the 11ax access point 230 in accordance with one or more application policies. Specifically, for upstream traffic which is determined by the client device 220 to be transmitted through the 11ay access point 240 (i.e., traffic coming from the 11ay connection point 224 of the client device 220 to the 11ay interface 242 of 11ay access point 240), the controller 210 may instruct the 11ay access point 240 to set up a tunnel 270*a* between the 11ay access point 240 and the 11ax access point 230. For downstream traffic which is determined by the traffic distribution module 280 of the 11ax access point 230 to be transmitted through the 11ay access point 240 (i.e., traffic coming from the distributed system 250 into the traffic distribution module 280), the controller 210 may instruct the 11ax access point 230 to set up a tunnel 270*b* to bridge the connection between the 11ax access point 230 and the 11ay access point 240. The controller 210 may share the IP address of the 11ay access point 240 with the 11ax access point 230 (and/or vice versa) to ensure that tunneling is done between the appropriate access points 230, 240. In an embodiment, the portions of the second data path 240*a* which run between the 11ay interface 242 and the traffic distribution module 280 may include the one or more tunnels 270*a*, 270*b* set up therebetween. In other words, certain portions of the second data path 240*a* may comprise 11ay tunnels 270*a*, 270*b*.

In operation, the controller 210 may detect a client device 220, including whether it is a dual band client having 11ax and 11ay Wi-Fi capability. The client device 220 may be associated with a single MAC address and IP address for all traffic, regardless of whether the client device 220 connects to the 11ax access point 230 via the first data path 230*a* or the 11ay access point 240 via the second data path 240*a*. Once a client device 220 has been detected, the controller 210 may identify the 11ax access point 230 (along with its associated first data path 230*a*) and the 11ay access point 240 (along with its associated second data path 240*a*) configured to transmit traffic to and from the client device 220.

For upstream traffic (traffic going from the client device 220 to the distributed system 250), the client device 220 may decide how the traffic will be transmitted, i.e., either through the 11ax access point through the first data path 230*a* or via the 11ay access point 240 through the second data path 240*a*, based on policies, applications, or other factors determined by the client device 220. For upstream traffic sent via 11ax, client traffic may be transmitted from the 11ax connection point 222 to the 11ax interface 232 and then to the traffic distribution module 280*a* via the first data path 230*a*. From there, the upstream traffic may be transmitted to the distributed system 250 via exit path 250*a*. For upstream traffic sent via 11ay, client traffic may be transmitted from the 11ay connection point 224 to the 11ay interface 242, and then through 11ay tunnels 270*a* and 270*b* to the traffic distribution module 280*a* via the second data path 240*a*. From there, the upstream traffic may be transmitted to the distributed system 250 via exit path 250*a*.

For downstream traffic (traffic coming in from the distributed system 250 to the traffic distribution module 280*a* and then directed to the client device 220), the controller may instruct the traffic distribution module 280*a* located in the 11ax access point 230 as to how to transmit the traffic, i.e., either via the 11ax access point 230 through the first data path 230*a* or via the 11ay access point 240 through the second data path 240*a*, based on one or more policies and/or pre-determined configurations established by the controller 210. For downstream traffic sent via 11ax, the traffic may be transmitted from the traffic distribution module 280*a* to the 11ax interface 232, and then to the 11ax connection point 222 of the client device 220 via the first data path 230*a*. For downstream traffic sent via 11ay, assuming that the client device 220 is within the coverage area of the 11ay access point 240, the traffic may be transmitted from the traffic distribution module 280*a* through one or more 11ay tunnels 270*a*, 270*b* and then to the 11ay interface 242, and then to the 11ay connection point 224 of the client device 220 via the second data path 240*a*.

As described above, the controller 210 may instruct the traffic distribution module 280 regarding which of the access points 230, 240 through which to transmit the traffic based on one or more policies and/or pre-determined configurations. For example, in an embodiment, the controller 210 may have a policy that determines how incoming data destined for the client device 220 is to be distributed among the 11ax and 11ay links. Policies may be based on application type policies, protocol type policies, IP address, and/or port numbers. The controller may also instruct the traffic distribution module 280 to transmit traffic based on reflective policies, wherein it uses the same policy for downstream traffic that the client device 220 uses for upstream traffic. In another embodiment, the determination of which access point 230, 240 through which to transmit the traffic may be based on pre-determined configurations which may be set when the 11ax access point 230 and/or the 11ay access point 240 powers on.

Figure 3:
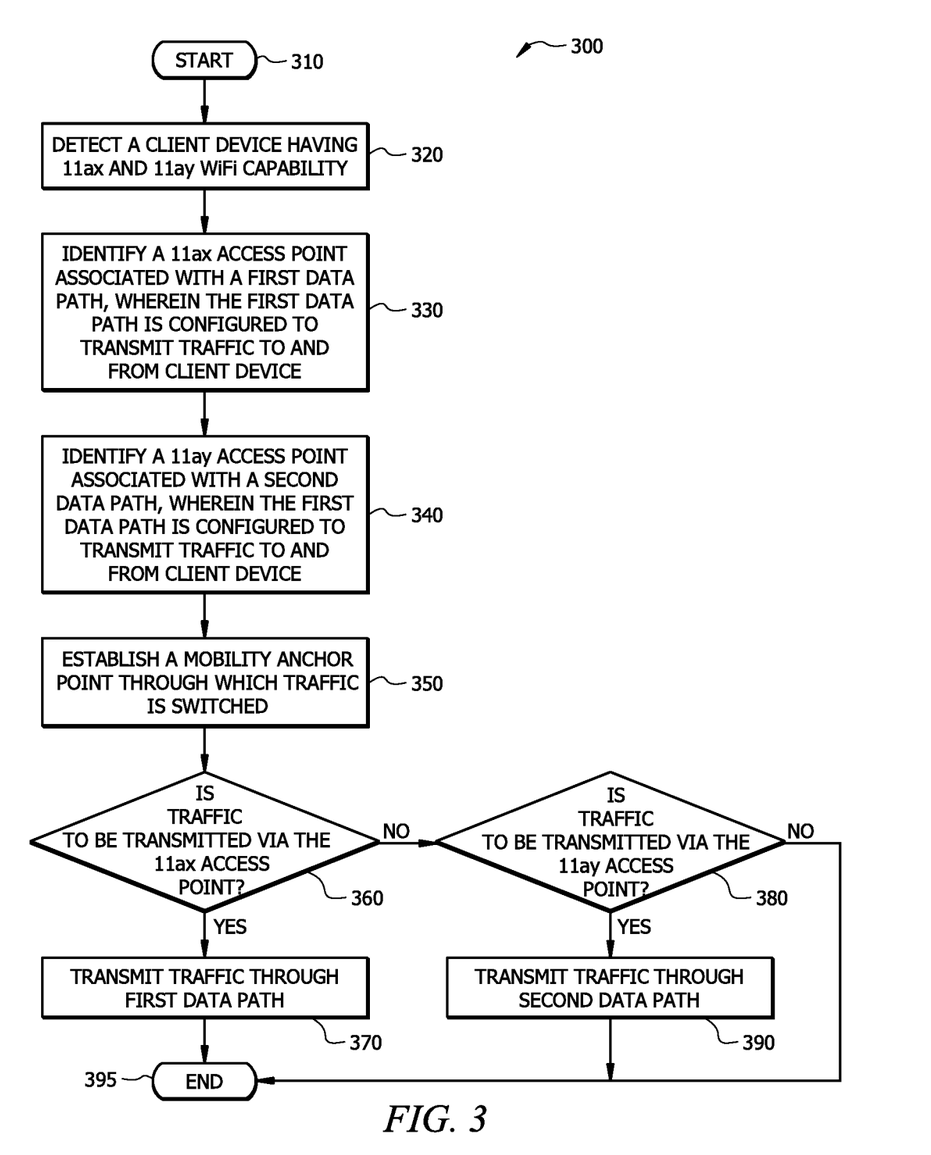
FIG. 3 illustrates a flow diagram of a method for seamless mobility between 11ax and 11ay Wi-Fi technologies, in accordance with certain embodiments.

Reference is now made to FIG. 3, wherein is shown a method 300 for providing seamless mobility between 11ax and 11ay Wi-Fi technologies. In an embodiment, the steps of method 300 may be performed by a controller. The method may start at step 310. At step 320, a client device having 11ax and 11ay Wi-Fi capability may be identified. The step of detecting the client device may further include determining the MAC address and/or IP address associated with the client device. The same MAC address and/or IP address may be used by the client device regardless of whether the client device connects to 11ax or 11ay Wi-Fi via a 11ax access point or a 11ay access point, respectively.

At step 330, a 11ax access point associated with a first data path may be identified. The first data path may be configured to transmit data to and from the client device. For example, the first data path may be configured to transmit data to the client device from a distributed system, and/or from a client device to a distributed system.

At step 340, a 11ay access point associated with a second data path may be identified. The second data path may be configured to transmit data to and from the client device. For example, the second data path may be configured to transmit data to the client device from a distributed system, and/or from a client device to a distributed system. The 11ay access point may be non-colocated with the 11ay access point, i.e., located in a different physical location than the 11ax access point. For example, in an enterprise setting, the 11ay access point may be located in a room (such as an office room or conference room) and may have a limited coverage area, and the 11ax access point may be located separately in a corridor and may have a wider coverage area.

In a local switching scheme, the second data path may include or more tunnels for connecting the 11ay access point to the 11ax access point. This is because, in a local switching scheme, one of the access points (for example, the 11ax access point) may act as a mobility anchor point (the point through which traffic is switched and transmitted), as further described below. In an embodiment, the controller may instruct the 11ay access point and/or the 11ax access point to set up one or more tunnels between the 11ay access point and the 11ax access point. For example, for upstream traffic (coming from the client device to the 11ay access point), the controller may instruct the 11ay access point to set up a tunnel between the 11ay access point and the 11ax access point. In another example, for downstream traffic (traffic coming from a distributed system into the 11ax access point), the controller may instruct the 11ax access point to set up a tunnel to bridge the connection between the 11ax access point and the 11ay access point. The controller may share the IP address of the 11ay access point with the 11ax access point (and/or vice versa) to ensure that tunneling is done between the appropriate access points.

In an embodiment, each of the two access points, the 11ax access point and the 11ay access point may be associated with an identifier. The controller may maintain a connection table for the client device, listing an identifier for each access point. Thus, for a given client device having a given MAC address, the controller may maintain a connection table to associate the MAC address of the client device with two identifiers for two associated access points, one for the 11ax access point and one for the 11ay access point. In other words, the controller may keep track of the client device, its associated MAC address, and the 11ax and 11ay access points having data paths through which traffic may be transmitted to and from the client device.

In an embodiment, if an access point is added, the controller may update or expand its connection table. Specifically, it may associate the MAC address of the client device not only with the identifiers of the existing access points (which would have already been listed in the connection table), but it would also add to the connection table an identifier for the new access point.

At step 350, a mobility anchor point may be established through which the traffic is to be transmitted. A mobility anchor point is a point through which traffic may be switched before being transmitted to its destination. In accordance with the present disclosure, the "establishing" of a mobility anchor point may include the creating or setting up of a mobility anchor point in an access point in a local switching scheme (for example, the 11ax access point may be established as a mobility anchor point by a controller), or establishing the controller itself as a mobility anchor point in a central switching scheme. In an embodiment, the mobility anchor point, whether established by the controller in the 11ax access point in a local switching scheme, or established in the controller in a central switching scheme, may include a traffic distribution module for determining how traffic will be transmitted, i.e., via the 11ax access point through the first data path or via the 11ay access point through the second data path. In one embodiment, the traffic distribution module may be a module of the controller. In another embodiment, the traffic distribution module may be established by the controller within the 11ax access point and the controller may inform the logic of the traffic distribution module.

In a central switching scheme, the mobility anchor point may be established as a function of the controller. For example, in a central switching scheme, the controller may serve the dual role of controlling and directing data/traffic flow. In this embodiment, both upstream and downstream traffic may be switched at the controller. For upstream traffic (traffic going from the client device to the distributed system), the controller may bridge the client traffic to the distributed system. For downstream traffic (traffic coming flowing from a distributed system to the client device), a traffic distribution module may be included in the controller and may determine whether to transmit the traffic to the client device via the 11ax access point through the first data path, or via the 11ay access point through the second data path. This determination may be made based on policies or reflective client behaviors.

In a local switching scheme, the mobility anchor point may be established by the controller in an access point, such as the 11ax access point. When the 11ax access point serves as the mobility anchor point, the controller may establish a traffic distribution module in the 11ax access point. For downstream traffic, the traffic distribution module may determine whether to transmit the traffic to the client device via the 11ax access point through the first data path, or via the 11ay access point through the second data path. This determination may be made based on one or more policies or pre-determined configurations, as described below.

In another embodiment, a traffic distribution function (a functionality similar to the traffic distribution module of the 11ax access point) may be included at the client device. For upstream traffic (i.e., traffic from the client device to the distributed system), the client device, through its traffic distribution functionality, may determine whether to transmit traffic from the client device to the distribution system via the 11ax access point through the first data path, or via the 11ay access point through the second data path.

At step 360, a determination may be made as to whether the traffic is to be transmitted via the 11ax access point. If, at step 360, it is determined that the traffic is to be transmitted via the 11ax access point, the method may proceed to step 370, wherein the traffic is transmitted through the first data path associated with the 11ax access point. At step 395, the method may end.

If, at step 360, it is determined that the traffic is not to be transmitted through the first data path, the method may proceed to step 380, wherein a determination may be made as to whether the traffic is to be transmitted via the 11ay access point. If at step 380, it is determined that the traffic is to be transmitted via the 11ay access point, the method may proceed to step 390, wherein the traffic is transmitted through the second data path associated with the 11ay access point. As described above, in a local switching scheme, the second data path may include one or more tunnels connecting the 11ax access point and the 11ay access point. Specifically, the controller may instruct the 11ay access point and/or the 11ax access point to set up one or more tunnels between the 11ay access point and the 11ax access point. Therefore, in a local switching scheme, if at step 380 it is determined that the traffic is to be transmitted via the 11ay access point through the second data path, the traffic may be transmitted through the one or more tunnels running between the 11ax access point and the 11ay access point along the second data path. At step 395, the method may end.

If, at step 380, it is determined that the traffic is not to be transmitted through the second data path, the method may end at step 395.

With respect to steps 360 and 380, in an embodiment, the step of determining whether the traffic will be transmitted via the 11ax access point or the 11ay access point may be made in accordance with one or more policies and/or pre-determined configurations. For example, policies may include how incoming data destined for the client device 220 is to be distributed among the 11ax and 11ay links. Policies may also be based on application type policies, protocol type policies, IP address, and/or port numbers. Policies may also include reflective policies, wherein the same policy used by the client device for upstream traffic may be used for downstream traffic. In another embodiment, the determination of which data path to transmit the traffic may be based on pre-determined configurations which may be set when the 11ax access point and/or the 11ay access point powers on.

It is to be understood that one or more steps of method 300 may be executed by a controller. In other embodiments, the method may be executed by one or more components of a system, such as systems 100 and 200 described in FIGS. 1 and 2, respectively. In still other embodiments, the method 300 of FIG. 3 may be construed in view of the described systems and processes of FIGS. 1 and 2.

It is to be understood that the order in which the method 300 is described is not intended to be construed as a limitation, and any number of the described method steps may be combined, modified, or carried out in any order to implement the method 300 or alternative methods. Additionally, individual steps may be deleted from the method 300 without departing from the spirit and scope of the subject matter described herein. Furthermore, the method 300 can be implemented in any suitable hardware, software, firmware, or combination thereof.

In sum, the systems and methods of the present disclosure may allow for a client device to seamlessly roam in and out of 11ax, 11ay, or other Wi-Fi coverage. For example, in a system including a client device having a MAC address or IP address mapped to a single 11ax access point, one or more new access points (such as an 11ay access point) may be added to the system, and one or more policies may be used to determine which access point will be used to transmit traffic to and from the client device.

While FIGS. 1-3 have been described with respect to 11ax and 11ay Wi-Fi technologies, it is to be understood that the concepts described herein may be extended to other Wi-Fi technologies. Additionally, while the present disclosure describes two data paths associated with two access points, it is to be understood that the systems of FIGS. 1-3 may accommodate any number of data paths associated with any number of access points.

Figure 4:
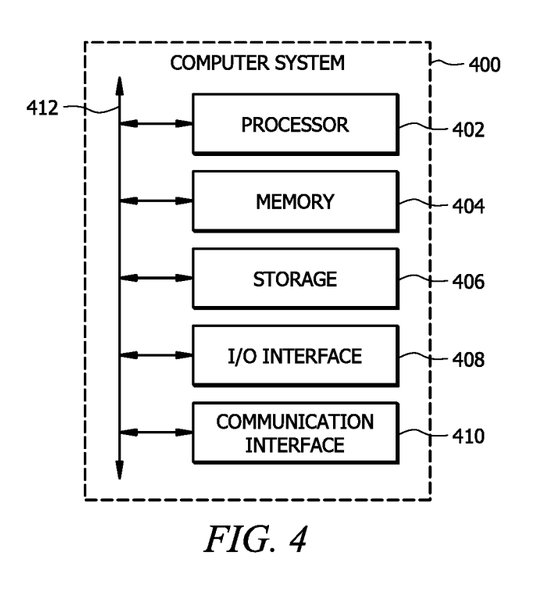
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
   one or more processors; and
   one or more computer-readable non-transitory storage media comprising instructions that, when executed by the one or more processors, cause one or more components of the system to perform operations comprising:
   detecting a client device having 802.11ax and 802.11ay Wi-Fi capability;
   identifying a 802.11ax access point associated with a first data path, wherein the first data path is configured to transmit traffic to and from the client device;
   identifying a 802.11ay access point associated with a second data path, wherein the second data path is configured to transmit the traffic to and from the client device and the second data path comprises one or more tunnels between the 802.11ay access point and the 802.11ax access point, and wherein the 802.11ay access point is non-colocated with the 802.11ax access point; and
   establishing a mobility anchor point through which the traffic is switched, wherein a determination is made in the mobility anchor point as to whether the traffic will be transmitted via the 802.11ax access point through the first data path or via the 802.11ay access point through the second data path.

2. The system of claim 1, wherein the operation of detecting comprises:
   determining a media access control (MAC) address of the client device.

3. The system of claim 2, the operations further comprising:
creating a connection table for storing the MAC address associated with the client device, and for storing a first identifier associated with the 802.11ax access point and a second identifier associated with the 802.11ay access point, wherein the connection table is used to subsequently identify the client device and the 802.11ax access point associated with the first data path and the 802.11ay access point associated with the second data path.

4. The system of claim 1, wherein the determination in the mobility anchor point is based on an application policy.

5. The system of claim 1, wherein the determination in the mobility anchor point is based on a past behavior of the client device.

6. The system of claim 1, wherein the determination in the mobility anchor point is based on one or more pre-configurations related to at least one of the 802.11ax access point and the 802.11ay access point.

7. A method, comprising:
detecting a client device having 802.11ax and 802.11ay Wi-Fi capability;
identifying a 802.11ax access point associated with a first data path, wherein the first data path is configured to transmit traffic to and from the client device;
identifying a 802.11ay access point associated with a second data path, wherein the second data path is configured to transmit the traffic to and from the client device and the second data path comprises one or more tunnels between the 802.11ay access point and the 802.11ax access point, and wherein the 802.11ay access point is non-colocated with the 802.11ax access point; and
establishing a mobility anchor point through which the traffic is switched, wherein a determination is made in the mobility anchor point as to whether the traffic will be transmitted via the 802.11ax access point through the first data path or via the 802.11ay access point through the second data path.

8. The method of claim 7, wherein the detecting step comprises:
determining a media access control (MAC) address of the client device.

9. The method of claim 8, further comprising:
creating a connection table for storing the MAC address associated with the client device, and for storing a first identifier associated with the 802.11ax access point and a second identifier associated with the 802.11ay access point, wherein the connection table is used to subsequently identify the client device and the 802.11ax access point associated with the first data path and the 802.11ay access point associated with the second data path.

10. The method of claim 7, wherein the determination in the mobility anchor point is based on an application policy.

11. The method of claim 7, wherein the determination in the mobility anchor point is based on a past behavior of the client device.

12. The method of claim 8, wherein the determination in the mobility anchor point is based on one or more pre-configurations related to at least one of the 802.11ax access point and the 802.11ay access point.

13. One or more computer-readable non-transitory storage media embodying instructions that, when executed by a processor, cause performance of operations comprising:
detecting a client device having 802.11ax and 802.11ay Wi-Fi capability;
identifying a 802.11ax access point associated with a first data path, wherein the first data path is configured to transmit traffic to and from the client device;
identifying a 802.11ay access point associated with a second data path, wherein the second data path is configured to transmit the traffic to and from the client device and the second data path comprises one or more tunnels between the 802.11ay access point and the 802.11ax access point, and wherein the 802.11ay access point is non-colocated with the 802.11ax access point; and
establishing a mobility anchor point through which the traffic is switched, wherein a determination is made in the mobility anchor point as to whether the traffic will be transmitted via the 802.11ax access point through the first data path or via the 802.11ay access point through the second data path.

14. The one or more computer-readable non-transitory storage media of claim 13, wherein the operation of detecting comprises:
determining a media access control (MAC) address of the client device.

15. The one or more computer-readable non-transitory storage media of claim 14, the operations further comprising:
creating a connection table for storing the MAC address associated with the client device, and for storing a first identifier associated with the 802.11ax access point and a second identifier associated with the 802.11ay access point, wherein the connection table is used to subsequently identify the client device and the 802.11ax access point associated with the first data path and the 802.11ay access point associated with the second data path.

16. The one or more computer-readable non-transitory storage media of claim 13, wherein the determination in the mobility anchor point is based on an application policy.

17. The one or more computer-readable non-transitory storage media of claim 13, wherein the determination in the mobility anchor point is based on a past behavior of the client device.

* * * * *